United States Patent
Davies et al.

(10) Patent No.: US 10,836,519 B2
(45) Date of Patent: Nov. 17, 2020

(54) DEPLOYMENT KIT

(75) Inventors: Andrew Alexander Davies, Shropshire (GB); Keith Stephen Mulhern, Erie, PA (US); Ranasinghe Hewage Prasad Kularatna, Kandy (LK); Gamaralalage Manoj Buddhika, Pallewela (LK)

(73) Assignee: AMSAFE BRIDPORT LIMITED, Bridport (GB)

( * ) Notice: Subject to any disclaimer, the term of this patent is extended or adjusted under 35 U.S.C. 154(b) by 0 days.

(21) Appl. No.: 13/564,385

(22) Filed: Aug. 1, 2012

(65) Prior Publication Data
US 2013/0032260 A1 Feb. 7, 2013

(30) Foreign Application Priority Data
Aug. 2, 2011 (GB) .................................. 1113256.0

(51) Int. Cl.
| B65B 11/02 | (2006.01) |
| B65B 7/08 | (2006.01) |
| B64D 9/00 | (2006.01) |
| B60P 7/08 | (2006.01) |

(52) U.S. Cl.
CPC .......... *B65B 11/02* (2013.01); *B60P 7/0876* (2013.01); *B64D 9/00* (2013.01); *Y10T 29/49826* (2015.01)

(58) Field of Classification Search
CPC ..... B60P 7/0876; B64D 9/00; Y10T 29/49826
USPC ............. 150/154–166; 206/257; 410/96–116
See application file for complete search history.

(56) References Cited

U.S. PATENT DOCUMENTS

| 2,455,237 | A | * | 11/1948 | Davis ..................... | B60P 7/0876 |
| | | | | | 150/154 |
| 2,646,097 | A | * | 7/1953 | Gaverth et al. ............... | 150/166 |
| 3,614,154 | A | * | 10/1971 | Evans ...................... | B60J 7/104 |
| | | | | | 296/100.16 |
| 4,611,961 | A | * | 9/1986 | Van Iperen et al. ............ | 410/20 |
| 4,718,711 | A | | 1/1988 | Rabbit | |
| 4,811,768 | A | * | 3/1989 | Williams ................. | A45C 1/04 |
| | | | | | 150/102 |
| 5,029,933 | A | * | 7/1991 | Gillem ..................... | B60J 11/00 |
| | | | | | 150/166 |
| 5,242,206 | A | * | 9/1993 | Heck ....................... | B60J 11/00 |
| | | | | | 150/166 |
| 5,328,230 | A | * | 7/1994 | Curchod .................. | 296/136.04 |
| 5,364,155 | A | | 11/1994 | Kuwahara et al. | |
| 5,401,074 | A | * | 3/1995 | Timerman ............... | B60J 11/00 |
| | | | | | 160/370.21 |
| 5,409,286 | A | * | 4/1995 | Huang ..................... | 296/136.04 |
| 5,506,020 | A | | 4/1996 | Haberkom | |
| 5,795,009 | A | * | 8/1998 | Sack ....................... | B62J 19/00 |
| | | | | | 150/167 |

(Continued)

OTHER PUBLICATIONS

Google-car, Google, searched term "car on pallet" before Aug. 1, 2011, search date: Aug. 16, 2017.*

(Continued)

*Primary Examiner* — Tri M Mai
(74) *Attorney, Agent, or Firm* — Oliff PLC

(57) ABSTRACT

A kit for covering a load (18) comprising: a cargo cover (10); a deployment means comprising a base sheet (2) for containing the cargo cover (10) prior to covering the load (18), the base sheet (2) comprising releasable securement means (4) for securing it around the cargo cover (10); and a plurality of cargo cover deployment straps (12, 14).

21 Claims, 7 Drawing Sheets

(56) References Cited

U.S. PATENT DOCUMENTS

| | | | |
|---|---|---|---|
| 5,993,062 A * | 11/1999 | Shackleton | 383/17 |
| 6,070,629 A * | 6/2000 | Whiteside | 150/166 |
| 6,092,857 A | 7/2000 | Rivas | |
| 6,863,482 B2 * | 3/2005 | Lockhart et al. | 410/97 |
| 6,968,801 B2 * | 11/2005 | Baker | 114/362 |
| 6,997,503 B2 | 2/2006 | Fukagawa | |
| 7,204,280 B2 * | 4/2007 | Allen | B60J 11/00 150/166 |
| 7,290,826 B2 * | 11/2007 | Dempsey | 296/136.13 |
| 7,337,793 B2 | 3/2008 | Chen | |
| 8,132,839 B2 * | 3/2012 | Penman | 296/100.04 |
| 2004/0035511 A1 * | 2/2004 | Rolph | 150/154 |
| 2005/0028910 A1 * | 2/2005 | Duty | 150/128 |
| 2005/0199661 A1 * | 9/2005 | Johnson | 224/257 |
| 2009/0236019 A1 * | 9/2009 | Maruzzo | 150/154 |
| 2010/0212789 A1 * | 8/2010 | De La Croix | 150/154 |
| 2011/0148138 A1 * | 6/2011 | Penman | 296/136.04 |

OTHER PUBLICATIONS

Google-Motorcycle, Google, searched term "pallet and motorcycle" before Aug. 1, 2011, search date: Aug. 16, 2017.*
Standard Pallet Sizes & Dimensions, search date Dec. 28, 2018, https://www.1001pallets.com/standard-pallet-sizes-and-dimensions/.*

* cited by examiner

DEPLOYMENT KIT

FIELD OF THE INVENTION

The present invention relates to a kit for covering a load, a kit for deploying a cargo cover over a load, and to a method of covering a load, for example, for transportation of a palletised load by road, sea, or air.

BACKGROUND OF THE INVENTION

It is well-known to transport goods on pallets. A pallet net is generally used to secure the goods on to the pallet. Cargo covers are often used to provide additional protection to a load, such as fire containment, waterproofing, thermal insulation, environmental protection, explosion containment, or any other form of protection that is desired. Cargo covers may be secured to a pallet using a cargo net, or by any other suitable means, as is generally well-known in the industry.

A problem associated with existing cargo covers is that they can be quite heavy, especially when they are sized to cover large loads, such as those generally used for air transportation. This can make them difficult to deploy over loads, and may require additional manpower or machinery for the loading process.

It is an object of the present invention to overcome some of the disadvantages of the prior art, or at least to offer an alternative solution to the currently available products and methods.

SUMMARY OF THE INVENTION

According to a first aspect of the present invention there is provided a kit for covering a load comprising: a cargo cover; a deployment means comprising a base sheet for containing the cargo cover prior to covering the load, the base sheet comprising releasable securement means for securing it around the cargo cover; and a plurality of cargo cover deployment straps.

Cargo covers generally comprise a rectangular roof panel and four wing panels extending from the edges of the roof panel. The wing panels are generally attached to adjacent wing panels such that the cargo cover defines five sides of a cube or cuboid shape. A problem with currently available cargo covers is that they can be large, heavy and unwieldy, and it is difficult for cargo handlers to deploy the cargo cover over the load. The present invention facilitates easier deployment of a cargo cover by containing it within a deployment means. The cargo cover can be neatly stored with the deployment means and then the deployment means is positioned on top of the load. Depending on the size of the load the deployment means can be lifted by cargo handlers, or it can be lifted on top of the load using a fork lift truck. Once the deployment means has been correctly position the deployment straps can be pulled, causing the releasable securement means to break open and the cargo cover to be deployed.

In an embodiment of the invention the cargo cover deployment straps are connected to the cargo cover.

In an alternative embodiment of the invention the cargo cover deployment straps are provided with means for releasably connecting them to the cargo cover.

In an embodiment of the invention the base sheet comprises positioning straps for positioning the kit on the load. The positioning straps may be pulled by cargo handlers to position the kit on the load prior to the pulling of the deployment straps to deploy the cargo cover over the load.

The positioning straps may conveniently be attached to the underside of the base sheet. The positioning straps may conveniently be provided in pairs, such that each member of the pair can be pulled from an opposite side of the load to aid positioning.

In an embodiment of the invention the releasable securement means comprises hook and loop fastenings. In an embodiment of the invention the releasable securement means comprises press stud fastenings. In an embodiment of the invention the releasable securement means comprises quick release fastenings. In some embodiments of the invention the releasable securement means are configured such that they open when the deployment straps are pulled. In alternative embodiments of the invention at least some of the releasable securement means must be opened by a user prior to use. In yet further embodiments of the invention at least some of the releasable securement means may be lockable to prevent tampering or theft of the cargo cover during storage or transit.

In an embodiment of the invention the positioning straps and the cargo cover deployment straps are provided with identification means. In an embodiment of the invention the identification means comprises coloured identification means. In an embodiment of the invention the identification means comprises straps having different characteristics. In an embodiment of the invention the positioning straps are formed from a braided material and the deployment straps are formed from a webbing material. In an embodiment of the invention the deployment straps are formed from a braided material and the positioning straps are formed from a webbing material.

The identification means enables a user to distinguish between the deployment means and the positioning means, and can even be used to enable a user to distinguish between different ones of the deployment means or positioning means, for example, deployment means or positioning means intended to be located on one side of a load may be a different colour to deployment means or positioning means intended to be located on an opposite side of the load. The identification means can help to speed up loading time, which is important in cargo handling.

In an embodiment of the invention the base sheet comprises pockets for storage of the cargo cover deployment straps and/or the positioning straps. The deployment straps and/or the positioning straps can be stored in the pockets when not in use, which can help to prevent damage and also ensure that the straps do not become separated from the base sheet in situations where they are not permanently connected.

In an embodiment of the invention the base sheet is provided with carrying handles. The carrying handles may conveniently be made from loops of webbing material stitched to the base sheet, such that the kit can be carried, for example in the manner of a holdall bag, when not in use. The carrying handles may also function as lifting loops for lifting the kit into position.

According to a second aspect of the present invention there is provided a kit for deploying a cargo cover over a load comprising: a deployment means comprising a base sheet for containing the cargo cover prior to deployment, the base sheet comprising releasable securement means for securing it around the cargo cover; and a plurality of cargo cover deployment straps, the deployment straps being provided with means for connecting them to the cargo net.

Additional features of this aspect of the invention are generally the same as those described with reference to the deployment means and deployment straps of the first aspect of the invention.

According to a third aspect of the present invention there is provided a method of covering a load comprising the steps of: providing a cargo cover with deployment straps, the cargo cover being stored in a deployment means, the deployment means being releasably secured around the cargo cover; placing the cargo cover and deployment means on top of the load; and pulling the deployment straps to release the cargo cover from the deployment means.

In an embodiment of the invention the deployment straps are releasably connectable to the cargo cover, and the method comprises the further step of attaching the deployment straps to the cargo cover.

In an embodiment of the invention the method further comprises the step of continuing to pull the deployment straps to deploy the cargo cover over the load.

In an embodiment of the invention the method further comprises the steps of: providing positioning straps attached to the deployment means; and pulling the positioning straps to position the cargo cover on top of the load.

In an embodiment of the invention the method comprises the step of folding the cargo cover for storage in the deployment means prior to use.

The present invention will now be described, purely by way of example, with reference to the accompanying drawings, in which:

BRIEF DESCRIPTION OF THE DRAWING

FIG. 2 shows a perspective view of a folded cargo cover on the base sheet of FIG. 1a;

DETAILED DESCRIPTION OF THE INVENTION

Figure 1A:
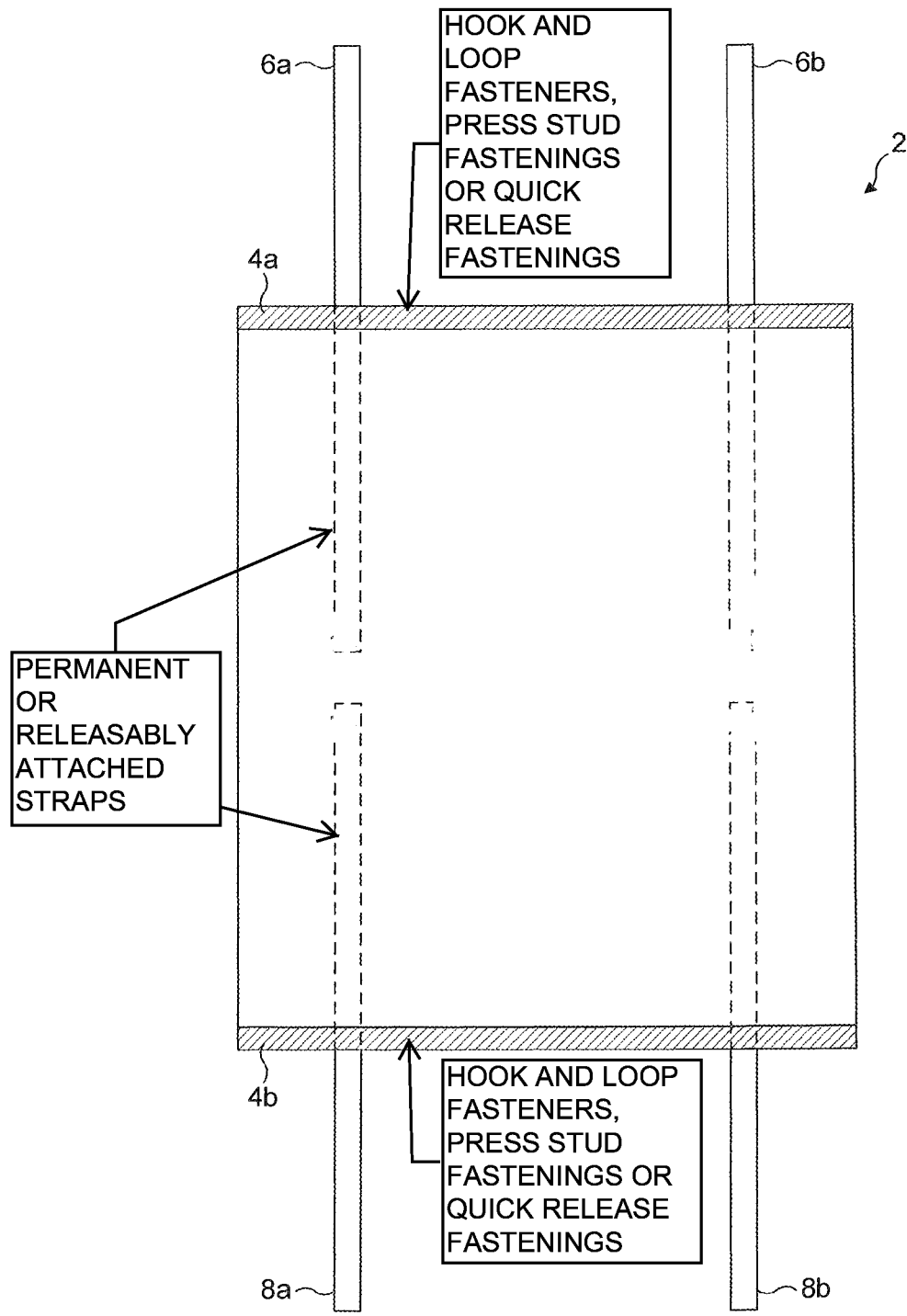
FIGS. 1a and 1b each show a plan view base sheet of a deployment means.
Figure 1B:
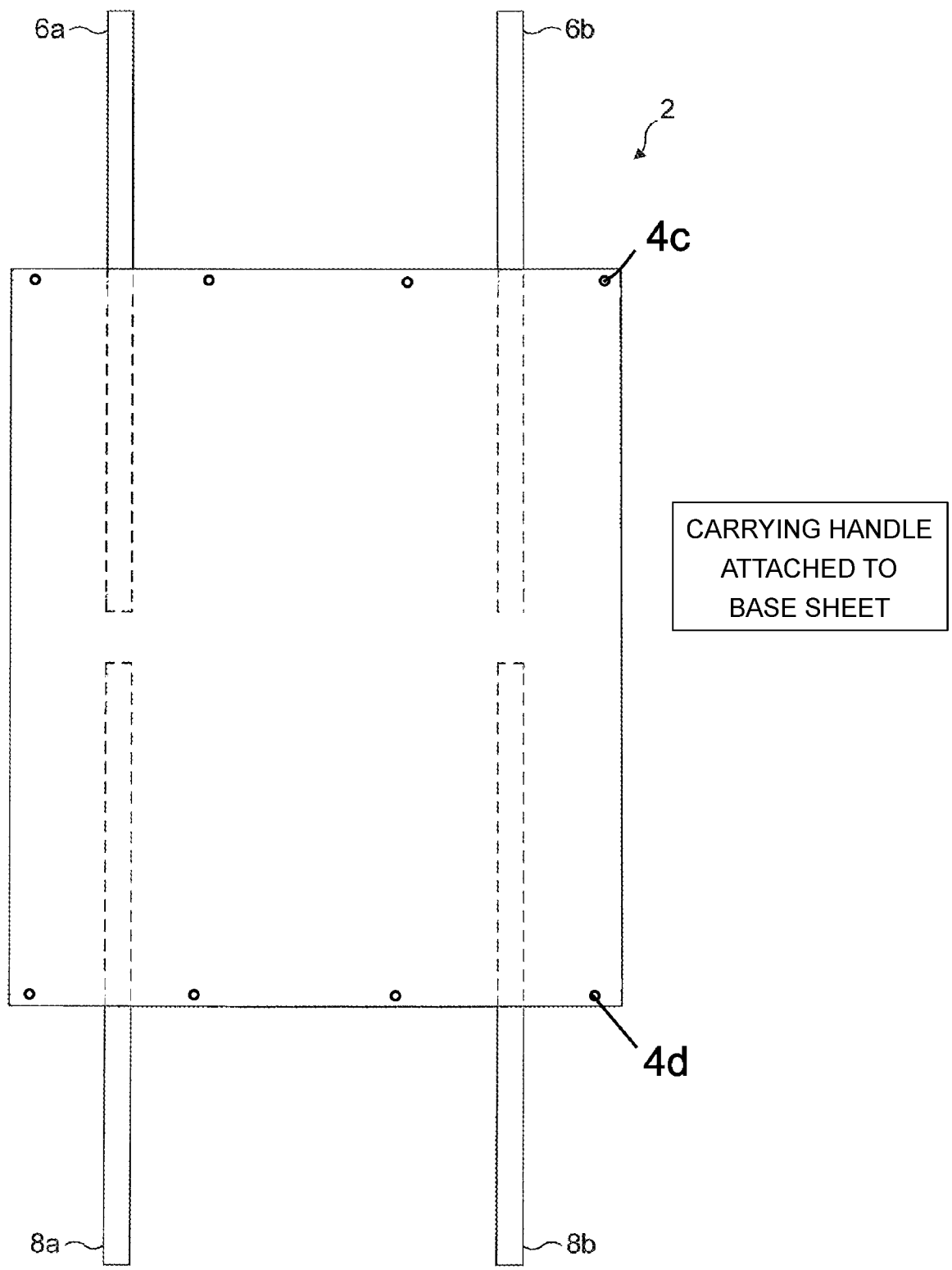

Referring firstly to FIGS. 1a and 1b, these show a plan view of a base sheet 2 of a deployment means. The base sheet 2 is made from a plastics material, such as polyethylene, which could be the same material as the material of a cargo cover it is intended to contain, or it could be a different material. The base sheet 2 can be single ply, double ply, or multi-ply, with insulation material provide between the layers if desired. Alternatively, the base sheet 2 can be formed from any suitable fabric material. The base sheet 2 will either be removed before transportation of the load, or it will sit under the cargo cover 10. It does not need to meet any particular fire safety requirements. However, it is preferred that the base sheet 2 is made from a fire resistant material, so as not to contribute to a cargo fire, or to provide additional fire protection to the roof of a fire containment cover. The base sheet 2 is preferably made from a lightweight, durable material which is strong enough to contain the cargo cover 10 in normal usage, but does not substantially increase the weight of a load.

The base sheet 2 is rectangular in shape, although other shapes are possible, as will be appreciated by the skilled person. The short sides of the base sheet 2 are each provided with one half of a releasable securement means 4. The releasable securement means comprises, in FIG. 1a, a hook and loop fastening, with a hook member 4a being provided along an edge of one short side and a corresponding loop member 4b being provided along an edge of the opposite short side. The hook and loop fastening 4a, 4b must be strong enough to secure the base sheet 2 around a cargo cover in normal use, but it must also be selected such that may be manually detached by a user, or users, when desired. In alternative embodiments of the invention additional securement means may be provided, e.g. quick release clips, which need to be manually undone prior to use. In yet further embodiments some of the securement means may be lockable to prevent theft or tampering during storage or transportation. Labels in FIG. 1a illustrate the use of hook and loop fasteners, press stud fastenings or quick release fittings, as described herein. FIG. 1b specifically illustrates press stud fasteners 4c and 4d, as well as a carrying handles 26, as described herein.

Positioning straps 6, 8 are attached to the underside of the base sheet 2. The positioning straps 6, 8 are formed from a webbing material of polyester or nylon, and are preferably made from a fire resistant material. The positioning straps 6,8 are permanently attached to the base sheet 2 by stitching 11, or any other suitable means. In an alternative embodiment of the present invention the positioning straps 6, 8 may be releasably connectable to the base sheet 2, for example using snap hooks and complementary fittings on the base sheet 2. The positioning straps 6, 8 are attached at attachment points, which are towards a centre line of the base sheet 2, midway between the two short sides. The positioning straps 6, 8 are coloured coded to aid identification and prevent cross over of the positioning straps 6, 8 during use. The positioning straps 6a, 8a on the left hand side of the base sheet 2 are differently coloured to the positioning straps 6b, 8b on the right hand side. This enables quick and easy identification of the positioning straps 6, 8 by cargo handlers—which is particularly important on large loads where the cargo handlers may not be able to see the base sheet 2 when it is on top of the load. The use of the positioning straps 6, 8 will be described in more detail in relation to FIGS. 2-6.

Figure 2:
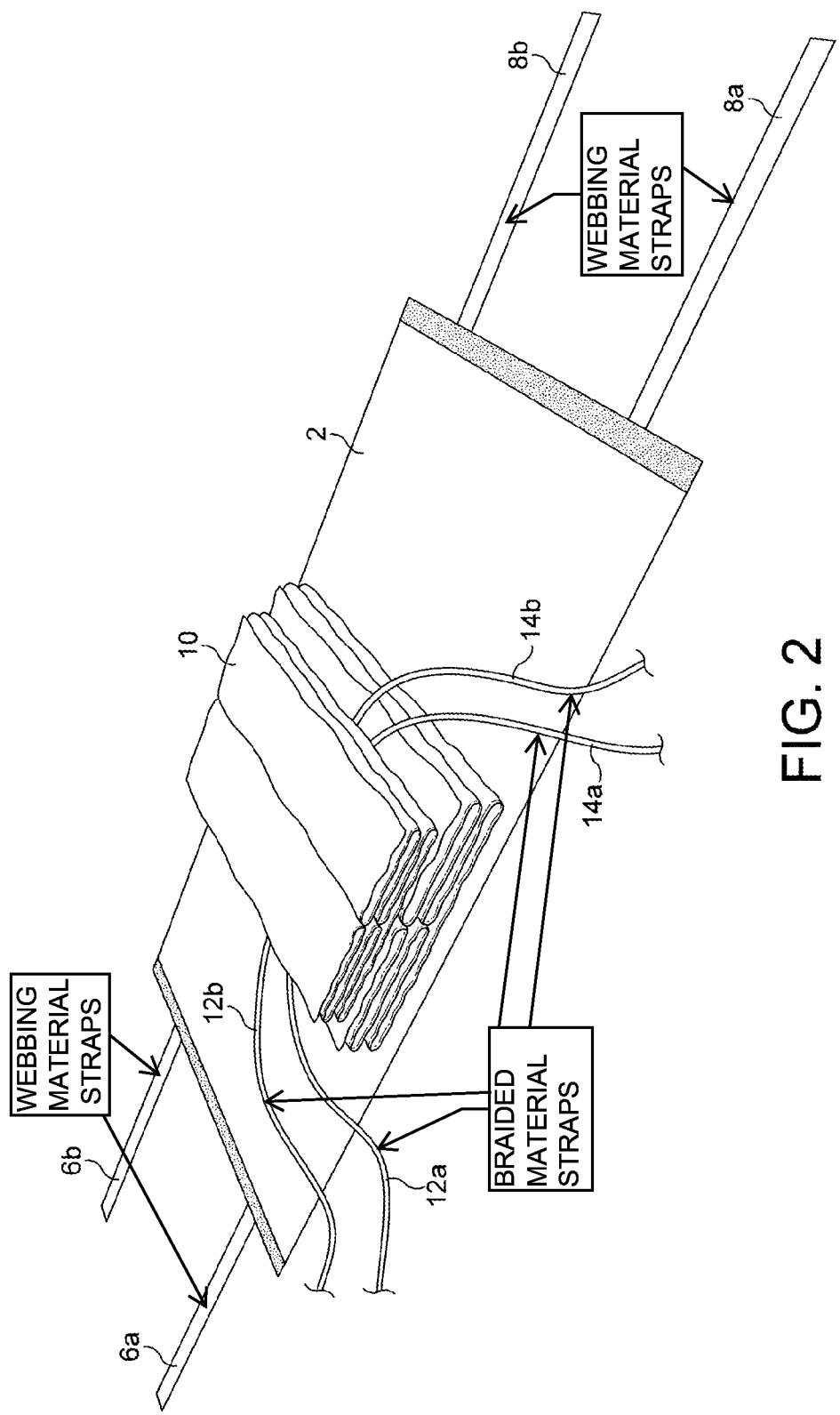

FIG. 2 shows a perspective view of a cargo cover 10 loaded on to the base sheet 2. The cargo cover 10 has been folded prior to loading on to the base sheet 2. The cargo cover 10 can be folded in a variety of ways, but it is preferably folded in such a way that it can be easily deployed over a load when required. If the cargo cover 10 has a cargo net attached then it is preferably folded in such a way that the cargo net does not protrude from the folded cargo cover 10. In order to fold the cargo cover 10 it is laid out as flat as possible and the bottom edges of the wing panels are folded inwards. Once the cargo cover 10 has been folded to a suitably small size, which depends on the size of the cargo cover 10, the size of the base sheet 2 and the size of the load, it is loaded on to the base sheet 2. The cargo cover 10 is made from a fire resistant material.

Cargo cover deployment straps 12, 14 are releasably attached to the cargo cover 10. The deployment straps 12, 14 are formed from a braided rope made from polyester or nylon which is attached to the cargo cover 10 by means of snap hooks (not shown). The cargo cover deployment straps 12, 14 are made from a fire resistant material. The snap hooks are attached to webbing loops at the bottom corners of the cargo cover 10. Alternatively, the deployment straps 12, 14 could be attached to any suitable existing feature on the cargo cover 10. Alternatively, in the case where the cargo cover 10 has an integral cargo net (as in the present case—see FIGS. 6a-6c), the deployment straps 12, 14 may be attached to a bottom edge of the cargo net. In an alternative embodiment of the present invention the deployment straps 12, 14 may be permanently attached to the cargo cover 10 or cargo net. Labels in FIG. 2 illustrate the use of webbing material straps and braided material straps, as described herein.

The deployment straps 12, 14 are preferably attached to the cargo cover 10 prior to folding, and care must be taken to ensure that the deployment straps 12, 14 are kept free when the cargo cover 10 is folded. As with the positioning straps 6, 8, the deployment straps 12, 14 are coloured coded to aid identification and prevent cross over during use. The deployment straps 12a, 14a attached to the left hand side of the cargo cover are differently coloured to the deployment straps 12,b, 14b on the right hand side. This enables quick and easy identification of the deployment straps 12, 14 by cargo handlers—which is particularly important on large loads where the cargo handlers may not be able to see the top of the load.

As noted above, the positioning straps 6, 8 are formed from a webbing material and the deployment straps 12, 14 are formed from a braided material. This helps for identification purposes and enables cargo handlers to quickly and easily distinguish between the two different types of straps. As will be explained in more detail below, the positioning straps 6, 8 are generally pulled before the deployment straps 12, 14, so it is important that cargo handlers are able to distinguish them easily. Forming the straps in this way is only one possible form of identification means, and it will be appreciated that other means are possible within the scope of the present invention, for example, the straps could be differently coloured to aid identification. Labels in FIG. 3 illustrate the use of differently coloured straps and the use of means for releasably connecting the straps to the cargo cover.

Figure 3:
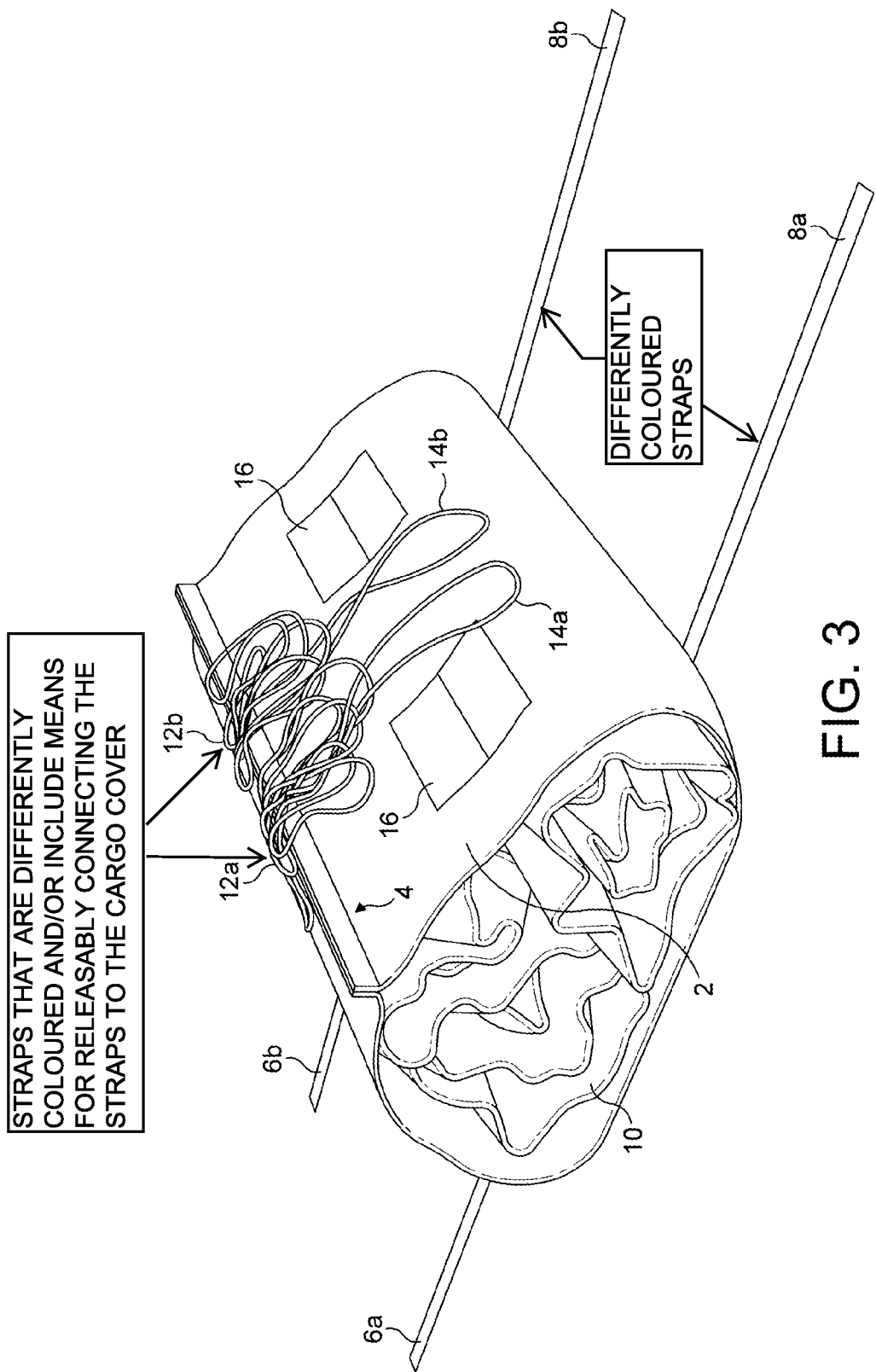
FIG. 3 shows a perspective view of the base sheet of FIG. 1a deployed around the cargo cover.

Once the cargo cover 10 has be folded and loaded on to the base sheet 2, the base sheet 2 is folded around the cargo cover 10 and the two halves of the releasable securement means 4a, 4b are brought together and secured, as can be seen in FIG. 3. Care must be taken when securing the base sheet 2 around the cargo cover 10 to ensure that the deployment straps 12, 14 extend out of the base sheet 2 and are freely accessible. As will be described in more detail below, the deployment straps 12, 14 are used to break open the open the releasable securement means 4 and aid deployment of the cargo cover 10, so they are preferably fed though the join between the two short edges of the base sheet 2.

The outer surface of the base sheet 2 is provided with pockets 16 which can be used for storage of the positioning straps 6, 8 and deployment straps 12, 14 when not in use. This can help to prevent the straps from becoming separated from the base sheet 2.

When the base sheet 2 is folded around the cargo cover 10 it provides protection for the cargo cover, for example from abrasion, dirt, UV deterioration, water damage, vermin, or other contamination. This serves to prolong the life of the cargo cover, as it would limit the wear and tear of the cargo cover 10 during the loading process, during storage and when the kit is in transit, e.g. when the cargo cover is being sent to operators from the manufacturer, or distributed by airlines to hubs, or redistributed after use. The base sheet 2 also serves to keep the cargo cover 10 in a compact form, which aids in handling and saves space in the storage of the cargo cover 10.

Figure 4:
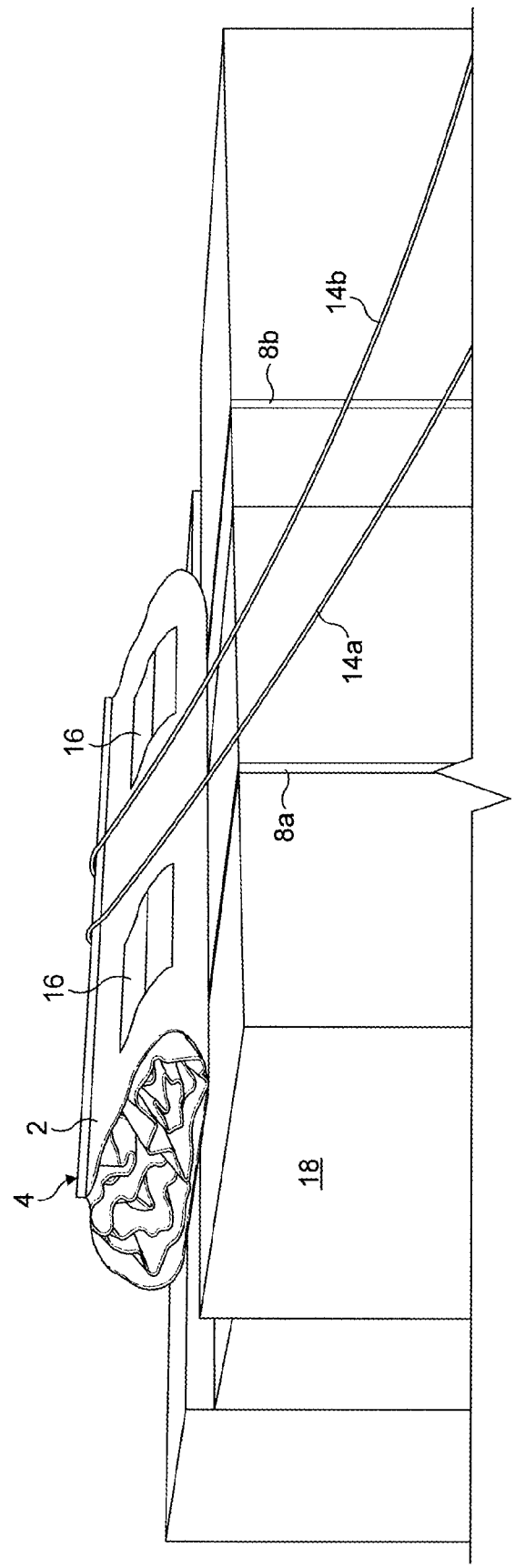
FIG. 4 shows a perspective view of the base sheet and cargo cover on top of a load.

The base sheet 2 containing the cargo cover 10 is then placed on top of a load 18, as shown in FIG. 4. Depending on the size of the load 18, particularly its height, and the combined weight of the base sheet 2 and cargo cover 10, the base sheet 2 and cargo cover 10 can be manually placed on top of the load 18 by cargo handlers or, more commonly, the base sheet 2 and cargo cover 10 will be placed on top of the load 18 using a fork lift truck, or other suitable lifting device.

While the base sheet 2 and cargo cover 10 are being lifted into position it is advisable for at least one cargo handler to take hold of the positioning straps 6, 8 and deployment straps 12, 14. In fact, it is preferable for a cargo handler on one side of the load 18 to hold the positioning straps 6a, 8a and deployment straps 12a, 14a for that side of the load 18 and another cargo handler, located on the opposite side of the load 18, to hold the other positioning straps 6b, 8b and deployment straps 12b, 14b for that side of the load 18. The positioning straps 6, 8 and deployment straps 12, 14 should be long enough to reach across the load 18 and hang down the side such that they can be grasped by a cargo handler standing on the ground.

Once the base sheet 2 and cargo cover 10 have been placed on top of the load 18 the cargo handlers can pull the positioning straps 6, 8 to position the base sheet 2 in the desired position, which will generally be in the centre of the load. The positioning straps 6, 8 are attached to the base sheet 2 only, so they will permit movement of the base sheet 2 without causing the cargo cover 10 to be deployed.

Once the base sheet 2 and cargo cover 10 have been moved to the desired position on top of the load 18 the cargo handlers can pull the deployment straps 12, 14 to deploy the cargo cover 10 over the load 18. Ideally at least two cargo handlers—positioned on opposite sides of the load 18—will pull the deployment straps 12, 14 simultaneously, and it is most preferred for four cargo handlers—located at the four corners of the load 18—to pull the deployment straps 12, 14 simultaneously. When the deployment straps 12, 14 are pulled it exerts a force on the releasable securement means 4, causing the two halves 4a, 4b of said means to pull apart, and release the cargo cover 10 from within the base sheet 2. As noted above, some embodiments may have releasable securement means which must be manually opened prior to use. Such securement means provide additional security and prevent the kit from accidentally opening.

Figure 5:
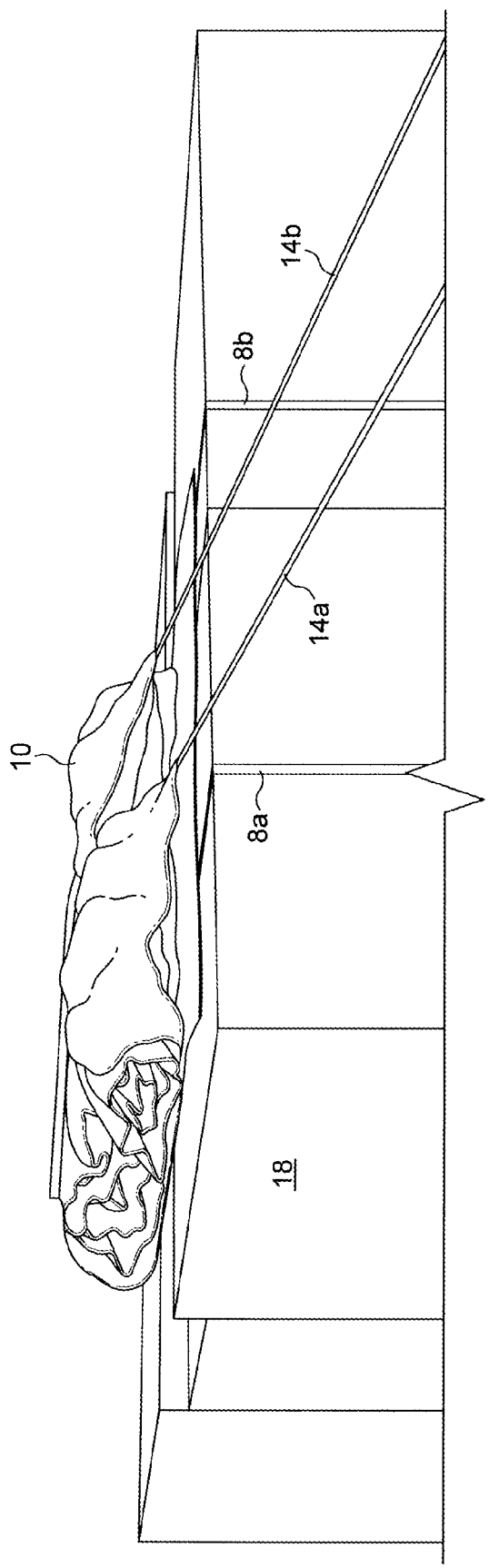
FIG. 5 shows a perspective view of the cargo cover in a partially deployed state.
Figure 6:
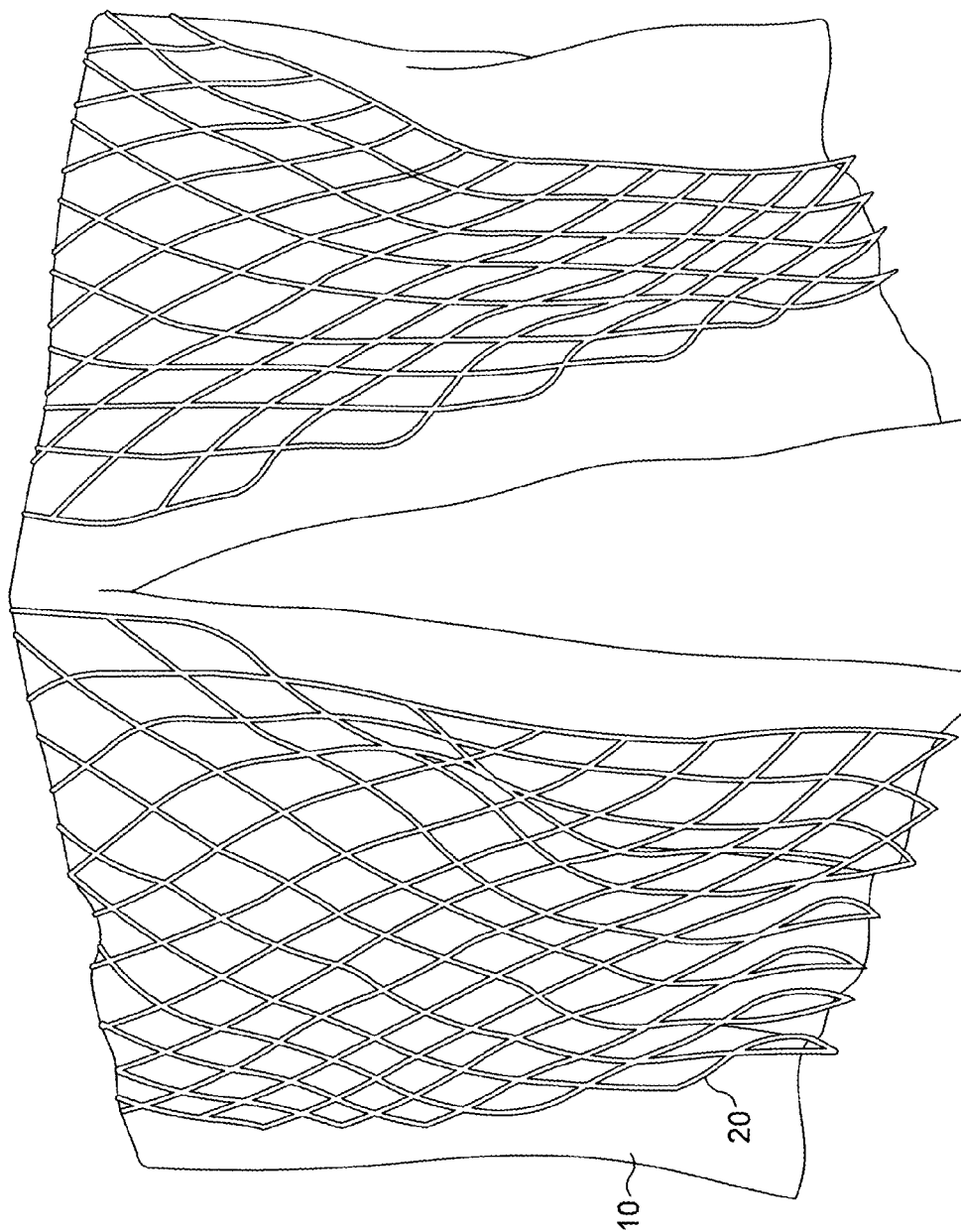
FIG. 6 shows a perspective view of the load with the cargo cover fully deployed.

FIG. 5 shows a perspective view of a cargo cover 10 being deployed over the load 18 in the manner described. The cargo handler(s) continue to pull the deployment straps 12, 14, which causes the cargo cover 10 to unfold from within the base sheet 2 and deploy over the load 18, as can be seen in FIG. 6. Once the cargo cover 10 has been fully deployed over the load 18 it is secured to a pallet in the usual manner. As can be seen in FIG. 6, the cargo cover 10 is provided with an integral cargo net 20. The present invention can be used with cargo covers 10 which are specifically adapted for the purpose, or it can be used with existing cargo covers.

Once the cargo cover 10 has been fully deployed over the load 18 the cargo handlers can pull the positioning straps 6, 8 to remove the base sheet 2 from under the cargo cover 10. Alternatively, the base sheet 2 can be left under the cargo cover 10 for transportation. One advantage of this is that the base sheet 2 will stay with the cargo cover 10 and it can be reused. If the base sheet 2 is removed from under the cargo cover 10 there is a possibility that it will become separated from the cargo cover 10. This may or may not be desired.

The present invention offers significant advantages for cargo handlers in terms of reduced loading time. This is important as a reduction in loading time means quicker turnarounds and an overall reduction in costs. By making the loading process easier for cargo handlers it also reduces the likelihood of cargo covers being inappropriately secured, which is clearly a danger in cargo transportation.

The invention claimed is:

1. A kit for covering a palletised cargo load, the kit comprising:
   a palletised cargo load cover comprising a rectangular roof panel and wing panels extending from edges of the rectangular roof panel;
   a deployment means comprising a base sheet for containing the palletised cargo load cover prior to the palletised cargo load cover covering the palletised cargo load, the base sheet comprising releasable securement means for securing the base sheet around the palletised cargo load cover in a closed configuration, wherein the base sheet further comprises positioning straps for positioning the kit on the load; and
   a plurality of palletised cargo load cover deployment straps extending from the palletised cargo load cover out of the base sheet in the closed configuration, the deployment straps connected to the palletised cargo load cover and configured to exert force on the releasable securement means when pulled while the base sheet is in the closed configuration to open the base sheet and deploy the palletised cargo load cover over at least a portion of the palletised cargo load, wherein:
   the palletised cargo load cover is sized to cover large loads as generally used for air transportation;
   the palletised cargo load cover is adapted to contain fire; and
   when deployed, the palletised cargo load cover defines five sides of a cube or cuboid shape.

2. The kit of claim 1, wherein the deployment straps are configured to extend from the palletised cargo load cover out of the base sheet in the closed configuration to reach across the palletised cargo load and hang down along at least a portion of a side of the palletised cargo load.

3. The kit of claim 1, wherein the palletised cargo load cover deployment straps are provided with means for releasably connecting the deployment straps to the palletised cargo load cover.

4. The kit of claim 1, wherein the releasable securement means comprises hook and loop fastenings.

5. The kit of claim 1, wherein the releasable securement means comprises press stud fastenings.

6. The kit of claim 1, wherein the releasable securement means comprises quick release fastenings.

7. The kit of claim 1, wherein the positioning straps and the palletised cargo load cover deployment straps are provided with identification means.

8. The kit of claim 7, wherein the identification means comprises coloured identification means.

9. The kit of claim 7, wherein one of the positioning straps and the deployment straps is formed from a braided material and other of the positioning straps and the deployment straps is formed from a webbing material.

10. The kit of claim 1, wherein the base sheet comprises pockets for storage of at least a portion of the palletised cargo load cover deployment straps and/or the positioning straps.

11. The kit of claim 1, wherein the base sheet comprises means for carrying the base sheet.

12. The kit of claim 1, wherein one or more of the palletised cargo load cover, the base sheet, the palletised cargo load cover deployment straps and positioning straps are formed from a fire retardant material.

13. The kit of claim 1, wherein the base sheet and the palletised cargo load cover are separable from one another.

14. A kit for deploying a palletised cargo load cover over a palletised cargo load, the kit comprising:
   a deployment means comprising a base sheet for containing the palletised cargo load cover prior to deployment of the palletised cargo load cover, the base sheet comprising releasable securement means for securing the base sheet around the palletised cargo load cover in a closed configuration, wherein the base sheet further comprises positioning straps for positioning the kit on the load; and
   a plurality of palletised cargo load cover deployment straps extending from the palletised cargo load cover out of the base sheet in the closed configuration, the deployment straps connected to the palletised cargo load cover and configured to exert force on the releasable securement means when pulled while the base sheet is in the closed configuration to open the base sheet and deploy the palletised cargo load cover over at least a portion of the palletised cargo load, wherein:
   the palletised cargo load cover comprises a rectangular roof panel and wing panels extending from edges of the rectangular roof panel;
   the palletised cargo load cover is sized to cover large loads as generally used for air transportation;
   the palletised cargo load cover is adapted to contain fire; and
   when deployed, the palletised cargo load cover defines five sides of a cube or cuboid shape.

15. A kit for covering a palletised cargo load, the kit comprising:
   a palletised cargo load cover comprising a rectangular roof panel and wing panels extending from edges of the rectangular roof panel;
   a base sheet to contain the palletised cargo load cover prior to deployment of the palletised cargo load cover, with releasable securement components configured to secure the base sheet around the palletised cargo load cover prior to deployment of the palletised cargo load cover in a closed configuration, wherein the base sheet further comprises positioning straps for positioning the kit on the load; and
   a plurality of palletised cargo load cover deployment straps extending from the palletised cargo load cover out of the base sheet in the closed configuration, the deployment straps connected to the palletised cargo load cover and configured to pull on the palletised cargo load cover to exert force on the releasable securement components while the base sheet is in the closed configuration to open the base sheet to release the palletised cargo load cover and deploy the palletised cargo load cover over at least a portion of the palletised cargo load, wherein:
   the palletised cargo load cover is sized to cover large loads as generally used for air transportation;
   the palletised cargo load cover is adapted to contain fire; and
   when deployed, the palletised cargo load cover defines five sides of a cube or cuboid shape.

16. The kit of claim 15, wherein the deployment straps are configured to extend from the palletised cargo load cover out of the base sheet in the closed configuration to reach across the palletised cargo load and hang down along at least a portion of a side of the palletised cargo load.

17. The kit of claim 15, wherein the palletised cargo load cover deployment straps are releasably connected to the cargo load cover.

18. The kit of claim 15, wherein the positioning straps and the palletised cargo load cover deployment straps including identification elements.

19. The kit of claim 15, wherein at least two opposing deployment straps are provided and wherein a first of the deployment straps is configured to pull on the palletised cargo load cover in a first direction to exert force on the releasable securement components in the first direction and a second of the deployment straps is configured to pull on the palletised cargo load cover in a second direction, opposite to the first, to exert force on the releasable securement components in the second direction, to thereby open the base sheet and release the palletised cargo load cover from the base sheet and deploy first and second portions of the palletised cargo load cover in opposing directions.

20. A kit for covering a palletised cargo load, the kit comprising:
   a palletised cargo load cover (i) having a first side and a second side opposite the first side and (ii) comprising a rectangular roof panel and wing panels extending from edges of the rectangular roof panel;
   a first palletised cargo load cover deployment strap having a free end and an end coupled to the first side of the palletised cargo load cover;
   a second palletised cargo load cover deployment strap having a free end and an end coupled to the second side of the palletised cargo load cover; and
   a base sheet including a releasable fastener movable between a closed configuration and an open configuration, wherein in the closed configuration, the palletised cargo load cover is secured within the base sheet in an overlapping configuration and the free ends of the first and second palletised cargo load cover deployment straps extend through the releasable fastener, wherein the base sheet further comprises positioning straps for positioning the kit on the palletised cargo load, wherein:
   the palletised cargo load cover is sized to cover large loads as generally used for air transportation;
   the palletised cargo load cover is adapted to contain fire; and
   when deployed, the palletised cargo load cover defines five sides of a cube or cuboid shape.

21. The kit of claim 20, the positioning straps comprising:
   a first positioning strap having a free end and an end coupled to the base sheet; and
   a second positioning strap having a free end and an end coupled to the base sheet, wherein the free end of the first positioning strap extends in an opposite direction from the free end of the second positioning strap.

\* \* \* \* \*